Oct. 20, 1964 J. S. LOWMAN III 3,153,523
VARIABLE LIFT AIRCRAFT WING PIVOTALLY MOUNTED FOR
MOVEMENT ABOUT A SKEWED LONGITUDINAL AXIS
Filed May 27, 1963 9 Sheets-Sheet 1

INVENTOR.
JEFFERSON S. LOWMAN III
BY Richard von K. Bruns
Atty.

INVENTOR.
JEFFERSON S. LOWMAN III

Oct. 20, 1964     J. S. LOWMAN III     3,153,523
VARIABLE LIFT AIRCRAFT WING PIVOTALLY MOUNTED FOR
MOVEMENT ABOUT A SKEWED LONGITUDINAL AXIS
Filed May 27, 1963     9 Sheets-Sheet 7

INVENTOR.
JEFFERSON S. LOWMAN III
BY Richard von K. Bruns
Atty.

INVENTOR.
JEFFERSON S. LOWMAN III

INVENTOR.
JEFFERSON S. LOWMAN III

United States Patent Office 3,153,523
Patented Oct. 20, 1964

3,153,523
VARIABLE LIFT AIRCRAFT WING PIVOTALLY MOUNTED FOR MOVEMENT ABOUT A SKEWED LONGITUDINAL AXIS
Jefferson S. Lowman III, 88 Farmedge Road, Levittown, N.Y.
Filed May 27, 1963, Ser. No. 283,412
20 Claims. (Cl. 244—46)

This invention relates generally to aircraft design and construction, and has particular reference to a novel construction for an aircraft wing. More specifically, the invention relates to a variable incidence wing construction in combination with suitable fuselage and tail structure, which wing construction permits safer and more efficient flight in modern high speed aircraft.

Since the development of jet propulsion for aircraft, there has been a constant demand for ever faster planes until at the present time very high speed aircraft are in military and commercial use, and the trend is towards supersonic aircraft capable of flying at up to three times the speed of sound. The high speeds attainable by today's aircraft, however, have resulted in a number of new problems some of which seriously affect the safety of the aircraft. High speed aircraft require high speed wings, and to reduce drag these wings ideally are short, thin and radically swept back. Since shorter wings usually provide less lift, longer runs and higher speeds are needed for take-offs and landings making the aircraft difficult to handle. Also, because of the extreme sweep-back of some of these wings the lift is applied too far aft and makes control of the aircraft all but impossible.

Another problem that has been frequently encountered with high speed, swept-wing aircraft is that of excessive yawing which is difficult for the pilot to overcome and sometimes leads to more serious problems. In maneuvering, the fixed swept-wing aircraft is also susceptible to stalling, and in a steep bank centrifugal force tends to force and twist the inside wing outwardly in such a manner that the aircraft can become an uncontrollable screw thread before the pilot can take compensating action. These problems are attributable, at least in some degree, to the fact that the two fixed wings of the aircraft must at all times act in unison whereby any movement of one wing is accentuated by the other.

The problems briefly mentioned above are recognized by the aircraft industry and various attempts have been made to solve or at least minimize them. These attempts have largely been directed toward wing design and have taken many different forms. For example, numerous high lift devices have been developed such as slats, slots and flaps in various combinations. These are intended to provide greater lift for shorter take-offs. Other devices such as spoilers are used to decrease or destroy lift after touchdown so that the full weight of the aircraft is put on the wheels sooner which affords more braking power. Devices have also been developed to direct or control the flow of air over the wing during flight such as fences and static generators.

In addition to the devices noted above, wings have been designed which have a very high angle of attack at the wing root only, and others have been developed with a "washout" or downward inclination adjacent the wing tips. More extreme, perhaps, are the so-called "variable geometry" wings where the wing or a portion of it is adapted to be pivoted horizontally to vary the degree of sweep.

Unfortunately, slats, slots, spoilers and the like further complicate an already complicated structure and give the crew of the aircraft that many more things to keep track of and control. Moreover, most of the other wing designs mentioned above have not proved particularly stable in flight. With respect to the variable geometry or variable sweep wing, this has not yet reached a practical form because of the tremendous amount of power required to move a large wing in full flight plus the problem of maintaining aerodynamic balance and stability. Most of the problem solutions that have thus far been proposed have not, therefore, materially alleviated the pilot strain and anxiety in large, heavy, high speed commercial aircraft where the responsibility for human life is overwhelming and something can go wrong so quickly that timely correction may be next to impossible.

It is believed that the present invention provides a practical solution to most of the problems that have been mentioned or eliminates them altogether. Briefly stated, the invention contemplates a swept back, variable incidence arched aircraft wing. This is not the same as a variable sweep wing; it is, rather, a wing that is movable from a low speed-high lift position to a high speed-low lift position. This is accomplished by providing a wing of particular configuration, to be described, with two transverse hinge joints whereby the main lift portion of the wing can be lowered or raised to assume a high lift position, a low lift position or any position in between. The main hinge joint is at or adjacent the fuselage and is offset with respect to the longitudinal axis of the fuselage by an angle of approximately 22° measured from the nose rearwardly. The main lift portion of the wing is outboard of the main hinge joint and ideally has a spheric configuration. The second hinge joint is at the outboard end of the main lift portion, and the portion of the wing outboard of this hinge joint is a control portion which may also hereinafter be referred to as a hold-down portion. The control portion is also ideally spheric in configuration.

The outboard control portion of the wing of the invention has a substantially smaller area than the main lift portion and is constructed and arranged so that it always has a slightly negative angle of attack when the fuselage is in a horizontal position. The control portion, as the name suggests, controls the position of the main lift portion, there being positive means operable from within the fuselage to regulate the position of the control portion. No means are provided for controlling the main lift portion per se since its position is automatically controlled by the position of the control portion.

When the control portion of the wing is moved by the pilot into its position of maximum negative angle of attack, this results in a downward force on the wing tip which in turn causes the main lift portion to move downwardly into its position of maximum angle of attack which is the high lift position. When the control portion of the wing is moved into its minimum angle of attack position, the downward force on the wing tip is substantially reduced and this allows the main lift portion to move upwardly into its minimum angle of attack position so that a high speed wing is obtained. The smaller control portion, or movable tip portion, of the wing of the invention can operate in this manner because of the mechanical advantage gained by its distance from the fuselage, and in effect it operates on the principle of a lever as will be presently explained. While the negative angle of attack of the control portion results in a small amount of drag, this drag at the tip portion of the wing is necessary and desirable for a second important function of the control portion which is that of a differential yaw damper or control. Thus, effective use is made of the tip portion of the wing which portion is generally regarded in conventional wings as having no important function beyond that of providing support for an aileron control surface.

The control portions of the two wings can be controlled independently of one another whereby the wing positions can be independently controlled. The center of lift of each wing is located at a relatively inboard position which facilitates control of the aircraft, and the wings are connected to the fuselage near the top thereof so that advantageous use may be made of the "bow wave" effect, all as will be described more fully hereinafter.

The wing construction of the invention results in part from a study of the manner in which birds, fish and the like use natural airfoil means for movement through a fluid. The airfoils of these creatures—wings, tails, fins, flippers—are in every instance variable with respect to the relative air or water and are not fixed and rigid as is the conventional aircraft wing. More specifically, the theory of the invention is derived from the manner in which birds, for example, control wing attitude in soaring flight.

It is believed that relatively few people have given serious thought to the manner in which birds control wing attitude, and those that have done so have generally concluded that the wing attitude is controlled solely by the bird's powerful pectoral muscles. However, after extensive study and research, the inventor has found that in most birds wing attitude is chiefly controlled by the primary flight feathers which in turn may be controlled by a relatively small amount of twisting muscle power located in the wrist, palm and fingers rather than in pectoral muscles. The primary flight feathers, because of their outboard location, have a mechanical advantage and may be thought of as operating on a lever principle. This mechanical advantage enables these flight feathers to effectively control the rest of the wing with a minimum expenditure of energy, and the control portion of the wing of the invention corresponds to this portion of a bird wing. An attempt is made, therefore, to utilize this and other aspects of natural flight in the construction disclosed herein.

With the foregoing and other considerations in view, it may be stated that the primary object of the present invention is to provide an aircraft wing construction which will permit substantially safer and more efficient flight in modern high speed aircraft.

Another important object of the invention is to provide an aircraft wing that is considerably more versatile than conventional wings and, at the same time, has a practical design.

Another important object of the invention is to provide a movable aircraft wing which utilizes in its construction certain advantageous characteristics of bird flight.

A further important object of the invention is to provide a novel variable incidence aircraft wing which can be moved relative to the fuselage to vary the angle of attack of the wing.

A still further object of the invention is to provide an arched variable incidence aircraft wing capable of movement between a low speed-high lift position and a high speed-low lift position whereby an aircraft equipped with the wing can take off and land at relatively slow speeds and fly at high speeds when fully under way.

Another object of the invention is to provide a variable incidence aircraft wing that makes an aircraft equipped with the wing more responsive and easier to control.

Another object of the invention is to provide a variable incidence aircraft wing which substantially reduces yawing, pitching and rolling during flight.

Still another object of the invention is to provide a variable incidence aircraft wing which minimizes the possibility of getting into an uncontrollable stall or spin.

A further object of the invention is to provide an aircraft construction wherein the wings can be independently moved relative to the fuselage.

A still further object of the invention is to provide a variable incidence aircraft wing wherein movement of the wing relative to the fuselage can be utilized to turn the aircraft without the necessity of a rudder control to coordinate the turn.

A more specific object of the invention is to provide a swept back aircraft wing having primary and secondary transverse hinge joints to permit the wing to be raised and lowered relative to the fuselage, within predetermined limits.

Another specific object is to provide an aircraft wing as described above wherein the primary hinge joint operatively connects the main lift portion of the wing to the fuselage, the joint being at an angle of approximately 22° to the longitudinal axis of the fuselage.

Another specific object is to provide an aircraft wing as described wherein a wing control portion is connected by means of the secondary hinge joint to the outboard end of the main lift portion.

A further specific object is to provide an aircraft wing as described wherein the adjusted position of the outboard control portion of the wing controls the position of the larger, main lift portion, the control portion being positively adjusted from within the fuselage and operating on the principle of a lever.

A further specific object is to provide a variable incidence aircraft wing which is adapted to be connected to the fuselage near the top thereof so that it can make effective use of the "bow wave" created by the fuselage.

A still further specific object is to provide a variable incidence aircraft wing which permits all the primary flight controls to be concentrated in the adjustable control portions located at the wing tips.

Another specific object is to provide a variable incidence aircraft wing which eliminates the need for controls such as slats, slots, spoilers, elevators and rudders.

Still another specific object is to provide a variable incidence aircraft wing which permits the fuselage to be maintained in a substantially horizontal position during ascent and descent of the aircraft.

A further object of the invention is to provide a variable incidence airfoil or wing construction which can be advantageously employed on other than aircraft type vehicles.

Other objects and advantages of the invention will become apparent from the following detailed description thereof read in conjunction with the accompanying drawings which illustrate a representative embodiment of the invention for the purpose of disclosure.

FIRST MODIFICATION

Figures 1, 2:
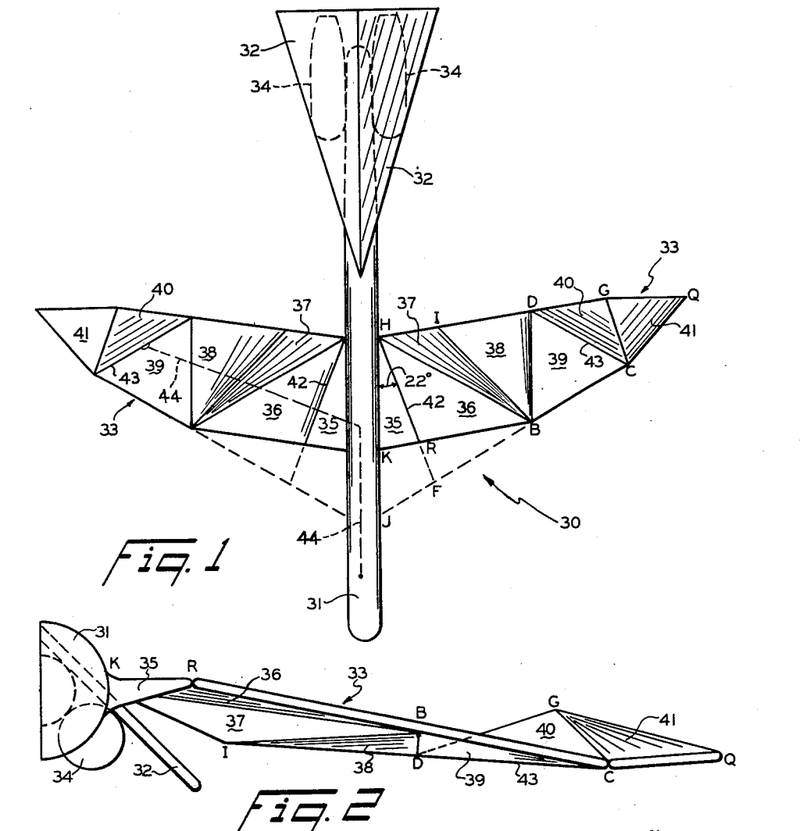
FIGURE 1 is a top plan view of an aircraft having wings constructed in accordance with the invention, this view and FIGURES 2 and 3 being schematic in nature.
FIGURES 2 and 3 are enlarged front elevations of the right wing of FIGURE 1 showing the wing in low speed-high lift and high speed-low lift positions, respectively.
Figure 3:
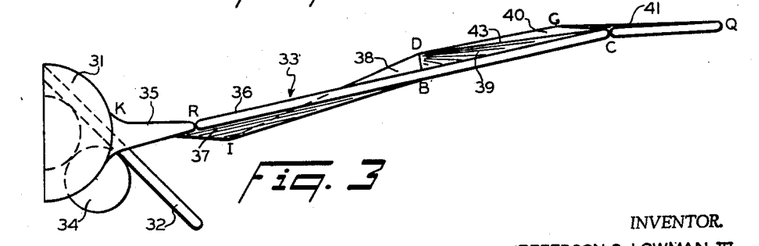

Having reference now to the drawings, and with particular reference to FIGS. 1–3, there is shown a variable incidence wing aircraft, generally designated by the reference number 30. Aircraft 30 is essentially comprised of a fuselage 31, suitable tail control surfaces 32 and wings 33. In the embodiment shown, the tail control surfaces have an inverted V configuration, and engine pods 34 are mounted on the fuselage below these surfaces.

Each wing 33 includes a fixed connecting portion 35 that may be either a part of the wing or a part of the fuselage, and conventional landing gear (not shown) may be mounted at this portion of the aircraft. Proceeding outboard from portion 35, each wing comprises successive portions or panels 36–41. In accordance with the invention, there is a primary hinge joint 42 at the junction of panels 35 and 36, and a secondary hinge joint 43 at the junction of panels 39 and 40. Panels 36, 37, 38 and 39 are rigidly connected to one another at their respective junctions, and panels 40 and 41 are likewise rigidly connected together.

The portion of each wing 33 between hinge joints 42 and 43 is the main lift portion of the wing, and the portion outboard of hinge joint 43, i.e., panels 40 and 41, is the control portion, the function and operation of which will hereinafter be explained. In the main lift portion, panels 38, 39 and 37 contribute most to the lift that is obtained. With particular reference to FIG. 1, panel 37 is downwardly inclined with respect to panel 36, panel 38 is upwardly inclined with respect to panel 37 and panel 39 is downwardly inclined with respect to panel 38. Thus, in this embodiment of the invention, the included angle between the lower surfaces of panels 36 and 37 is approximately 157° (see FIGURE 2); likewise, the included angle between the upper surfaces of panels 37 and 38 and between the lower surfaces of panels 38 and 39 is approximately 157°. As noted above, panels 36, 37, 38 and 39 are rigidly connected together. With respect to panels 40 and 41 of the control portion of the wing, the included angle between the lower surfaces of these panels is also approximately 157°.

As best shown in FIG. 1, the wings 33 are moderately swept back and the primary hinge joint 42 is offset with respect to the longitudinal axis of the fuselage. It has been found that the optimum angular offset for the hinge joint 42 is approximately 22° measured from the nose of the fuselage rearwardly. Thus, angle KHR is approximately 22° as shown in FIG. 1. Because of the hinge joint 42, the entire wing outboard thereof is permitted limited up and down movement, and in addition the hinge joint 43 permits limited up or down movement of the control portion (panels 40, 41) relative to the main lift portion. However, the control portion has at all times a negative angle of attack due to the angular relationship of its panels 40, 41 and the range of movement permitted by the hinge joint 43.

In this invention, the control portion of the wing controls the position of the main lift portion and is the only means for so doing. To this end, means are provided so that the position of the control portion can be regulated from within the fuselage, and by adjusting the control portion the main lift portion is made to assume a position having the desired angle of attack. No means are needed for controlling the main lift portion per se. The mechanism for regulating the position of the control portion passes through hinge joints 42, 43 and can be of a conventional hydraulic type such as presently used for raising and lowering landing gear or for controlling flaps and ailerons. This mechanism is indicated schematically by dash line 44 in FIG. 1, representing one or more hydraulic lines with which there would be the usual hydraulic cylinders, pumps, etc. (not shown).

FIGS. 2 and 3 show the wing in substantially the extreme positions of its range of movement. In FIG. 2 the wing is shown in a low speed-high lift position, and in FIG. 3 it is shown in a high speed-low lift position. The wing is moved into the FIG. 2 position by elevating the control portion thereof into its position of maximum negative angle of attack as indicated in the drawing. Moving the control portion into this position results in a downward force on the wing tip which forces the entire wing to move downwardly since it is free to swing at the hinge joint 42 within predetermined limits to be described. When the wing moves downwardly the main lift portion has a pronounced positive angle of attack due to the wing configuration and this produces the desired lift.

When high lift is no longer needed and minimum drag is desired, the control portion is lowered to its position of minimum negative angle of attack as shown in FIG. 3. This substantially reduces the downward force on the wing tip and allows the wing to swing freely upward due to gravitational forces on the fuselage and air pressure exerted on the underside of the wing. The wing then assumes the high speed low-lift position of FIG. 3, the main lift portion and control portion both having close to zero angles of attack and drag being reduced to a minimum.

In order to operate as above described, both of the hinge joints must have positive stops or other movement limiting means as previously noted. It has been determined that the optimum range of angular movement at both hinge joints is in the vicinity of 22°. At the primary hinge joint 42, this range includes movement approximately 11° above or below the horizontal. Thus, if the upper surface of the fixed connecting panel 35 is assumed to be horizontal in FIGS. 2 and 3, the substantially straight leading edge of the wing from R to C is shown with a downward incline of approximately 11° from this surface in FIG. 2 and an upward incline of approximately 11° in FIG. 3. At the secondary hinge joint 43, the lower limit of movement of the control portion is at a point where panels 39 and 40 are substantially coplanar, and the upper limit of movement is at a point where panel 40 has an upward incline of approximately 22° from panel 39.

In connection with the foregoing description, it is important to point out that in moving from the position shown in FIG. 2 to the position shown in FIG. 3, or vice versa, the trailing edge of the main lift portion of wing 33 must "cross over" the leading edge in order for this portion of the wing to shift between a positive angle of attack position and a zero or slightly negative angle of attack position. Thus, it will be observed that in FIG. 2 trailing edge increments HI, ID and part of DG are below the leading edge while in FIG. 3 part of increment ID and increment DG are above the leading edge. This is particularly noticeable with respect to trailing edge point D, and since panels 38, 39 and 37 provide most of the lift for the wing it will be apparent why the degree of lift is radically changed by the crossing over of the trailing edge just described. However, for the trailing edge crossover to occur, another element is necessary which is that the trailing edge increment HID be longer than the leading edge increment RB as best shown in FIG. 1.

Even if the trailing edge increment HID is longer than the leading edge increment RB, there would be no trailing edge crossover if the primary hinge joint 42 were not offset with respect to the longitudinal axis of the fuselage as for example, if the hinge joint were along the line KH in FIG. 1. Thus, both the offset hinge joint and the longer trailing edge increment are necessary for the trailing edge crossover and consequent change in angle of attack described above. With reference to the offset hinge joint 42, it is in all instances necessary that the wings 33 be swept back in order to operate properly. Thus, with no sweep-back and an offset hinge angle, raising or lowering the wing more than a few degrees would turn too much wing surface into the path of the relative air causing excessive drag and instability.

While the hinge joint 42 has previously been described as being angularly offset approximately 22°, it should be pointed out that this offset could be in the range of 7–27° and the wing would still operate as explained above. However, it has been determined that 22° is the optimum angle of hinge offset for the greatest variation in the angle of attack with the minimum amount of wing movement while remaining within control movement tolerances. With respect to the 7–27° range mentioned above, it is unlikely that the wing could be made to function in the desired manner if the angle of hinge offset were outside this range. Thus, if the offset angle were less than 7° it would not be possible to obtain sufficient change in the angle of incidence of the wing within the practical limits of wing movement. On the other hand, if the offset angle were greater than 30° the control portion would be incapable of controlling the wing, and the probable result would be that the aircraft would go into an uncontrollable spin.

*Derivation*

Figure 4:
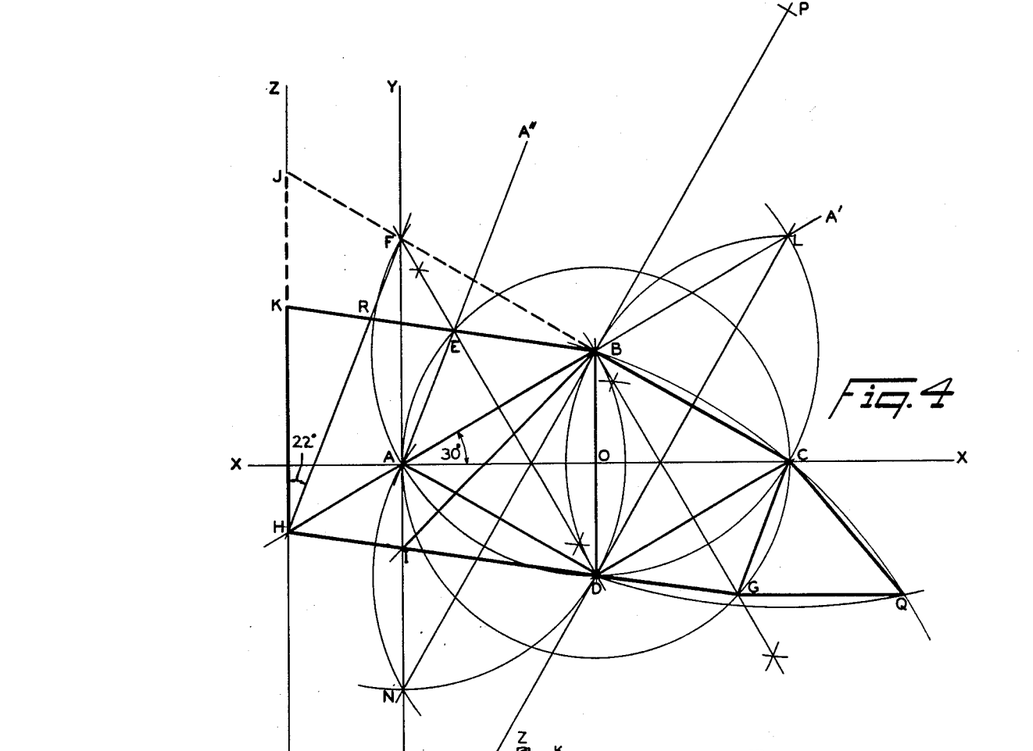
FIGURE 4 is a diagrammatic illustration of a mathematical derivation of the wing of FIGURE 1.

The configuration and proportions of the wing shown in FIGS. 1–3 have been derived by mathematical means and one such derivation is disclosed in FIG. 4, other derivations being possible. The derivation of FIG. 4 is as follows:

(1) Construct horizontal and vertical axes X—X and Y—Y intersecting at point A.

(2) Draw line AA' at a 30° angle to the X—X axis.

(3) Lay off AB 2¼" long. (The length AB is, of course, scaled down in the drawing. In practice it will be measured in feet and its length will be determined by the wing span or wing area desired.)

(4) Drop a perpendicular from B to the X—X axis and extend down. The intersection point is O.

(5) Draw a circle with O as the center and OA as the radius.

(6) Construct diamond ABCD (comprising four equal 30°—60°—90° triangles.

(7) Bisect line AB and erect a perpendicular. This line intersects the circle at E and the Y—Y axis at F. Extend the line downwardly to point D.

(8) Bisect line DC and erect a perpendicular. This line intersects the circle at G. Extend the line upwardly to point B.

(9) Draw a line AA'' through point E.

(10) Draw lines EB, DG and GC. (It will be seen that two equal kite shaped figures AEBD and CGDB have now been constructed.)

(11) Extend line AB downwardly to the left, and line DG to the left. These lines intersect at point H.

(12) Line DH crosses the Y—Y axis at point I.

(13) Draw line IB.

(14) Erect a vertical line through point H and label it axis Z—Z. (This line is perpendicular to the X—X axis.)

(15) Draw dash line BF and extend to the Z—Z axis. The intersection point is J.

(16) Extend line BE to the Z—Z axis. The intersection point is K.

(17) Draw line FH. This line intersects line KB at point R. (The line HR establishes the primary hinge angle and is parallel to lines AE and GC.)

(18) Using B as the center, draw an arc through points D and C and extend upwardly. The radius is BD.

(19) Using C as the center and CD as the radius, draw an arc through points D and B and extend upwardly to intersect the arc drawn in step 18.

(20) The intersection of these arcs is point L. Point L should lie on the line AA'.

(21) Draw line LD and extend downwardly to cross the Y—Y axis.

(22) On this line lay off DM equal to DL. Point M should fall on the Y—Y axis.

(23) Using M as the center and MB as the radius swing an arc to the right. This arc passes through points B and C and can be the leading edge of the wing.

(24) Using A as the center and AB as the radius, swing an arc down to the right and across the Y—Y axis.

(25) Using D as the center and DB as the radius, swing an arc down to the left and across the Y—Y axis.

(26) Label the intersection point of these two arcs N. Point N should fall on the Y—Y axis.

(27) Draw line NB and extend upwardly.

(28) On this line lay off BP equal to BN.

(29) Using P as the center and PD as the radius, swing an arc to the right to intersect the arc constructed in step 23. This arc can be the trailing edge of the wing.

(30) Label the intersection of these arcs point Q. This point determines the limits of the wing span.

(31) Draw lines CQ and GQ.

In the FIG. 4 derivation, the Z—Z axis represents the line of fuselage, and the wing outline (in a clockwise direction) is K–R–B–C–Q–G–D–I–H as is also shown in FIG. 1. The line HR represents the primary hinge joint, and the above described derivation results in this line being offset about 22° from the Z—Z axis. In other words, the angle KHR is approximately 22° as stated previously. The secondary hinge joint is along line DC. For certain applications, the wing could also include the area bounded by dash lines KJ and JB in which case the primary hinge joint would extend to the point F. This additional possible wing area is also shown in FIG. 1.

Figure 4A:
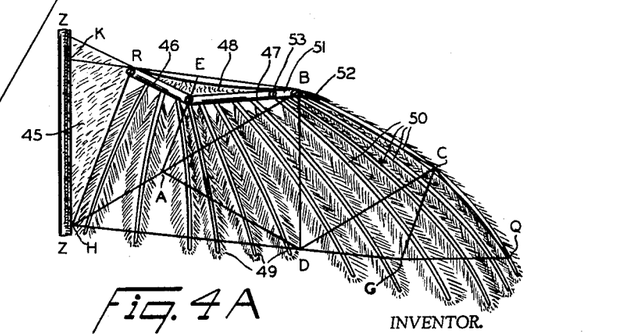
FIGURE 4A is a diagrammatic illustration of a bird wing with a portion of the FIGURE 4 illustration superimposed thereon.

FIG. 4A is a diagrammatic or simplified illustration of a bird wing on which a portion of the FIG. 4 derivation has been superimposed. In this wing, which corresponds roughly to the wing of a dove, Z—Z represents the vertebral column and the shaded area 45 between Z—Z and HR represents one side of the bird body. The wing is connected to the body at the shoulder R and 46 and 47 represent the heavy wing bones, the humerus and ulna, respectively, which are connected together by an elbow joint. The outer end of the ulna 47 is also connected to the shoulder R by a wing membrane 48. The secondary flight feathers 49 originate from the ulna. The primary flight feathers 50 originated from the hand 51 and forefinger 52, the hand being connected to the outer end of the ulna by the wrist joint 53.

In bird flight, the secondary feathers maintain lift while the primary feathers provide a propeller action. The primary feathers can also be spread apart and drawn together, as with the fingers of the hand, and rotated in various ways to control both propelled flight and soaring which is sustained flight without apparent wing movement. From the FIG. 4 diagram overlying the bird wing of FIG. 4A, it will be seen that the main lift portion of the aircraft wing of the invention, i.e., triangles ABD and CBD, substantially correspond with the main lift portion of the bird wing (the secondary flight feathers 49) and inner or root portions of the primary flight feathers 50. Also, the control portion of the aircraft wing, i.e., triangles DCG and QCG, substantially corresponds with the outer portions of the primary or flight control feathers. While no attempt can be made in this disclosure to explain the complexities of bird flight, the above-mentioned functions of the primary flight feathers are well recognized and it will be understood that the outboard location of these feathers, and particularly the outer portions thereof, provides a mechanical advantage which enables precise control with a minimum expenditure of energy. This scheme or characteristic of bird flight has, therefore, been utilized for the wing of the invention in the manner indicated.

Operation

Referring again to FIGS. 1–3, the manner in which wing 33 is raised and lowered to vary the angle of incidence has already been described. It has also been pointed out that the primary objective of this variable high speed-low speed wing is to enable safer, more efficient flight in modern aircraft. The operation of the wing during operation of the aircraft is as follows:

On take-off, when the aircraft is starting down the runway, wings 33 are initially in the high speed-low lift position (FIG. 3) so that there is minimum drag until the necessary speed is gained. The wings are then moved down into the high lift position by moving the control portion to its maximum negative angle of attack position (FIG. 2). This causes the aircraft to leave the runway and climb, the rate of climb being determined by the angular adjustment or angle of attack of the wings and amount of power supplied by the engines. In this connection, the construction of the wing of the invention is such that no part of it ever exceeds a 22° positive angle of attack when the fuselage is in a horizontal position because a greater angle would cause the wing to become a drag surface as is well known in the art. Moreover, the variable incidence wing construction disclosed normally enables the fuselage to maintain a substantially horizontal position as will be described hereinafter.

Upon reaching the desired altitude, the wings are moved up into the high speed-low lift position, this being accomplished by moving the control portion down into its minimum negative angle of attack position. In this position, drag is again reduced to the minimum and full power can be applied for high speed flight. In order to descend for landing, the wings are moved down to an approximately mid-wing position and the power is decreased. Moving the wings to the mid-wing position gives them a positive angle of attack and creates some drag just as lowered flaps do on a fixed wing aircraft. In the approach to the runway, the wings are gradually lowered further until they are in their high lift position just before landing. This results in gradually increased drag or braking and a corresponding reduction in speed. In addition, by lowering the wings into their high lift position just prior to landing, advantage is taken of the ground cushion effect which can help to make a soft landing.

As noted just above, the wing construction of the invention normally enables the aircraft fuselage to be maintained in a substantially horizontal position during flight. This is due to the fact that the wings can move relative to the fuselage to vary their angle of attack. Thus, even when ascending or descending as above described, the fuselage will stay in a level position. On a fixed wing or conventional aircraft, on the other hand, the wing is secured to the fuselage at some particular angle and this angle can thereafter only be varied by tilting the fuselage up or down. For a conventional aircraft to climb, the entire aircraft must be inclined upwardly to increase the angle of attack of its wings. In descending, the conventional aircraft is tilted downwardly but since this in itself does not result in a wing braking action as described in the preceding paragraph, the flaps must be lowered to provide this action.

In the aircraft disclosed herein, the tail performs a trim function and need not be provided with elevators as in a conventional aircraft. Thus, the tail operates in a substantially constant manner. Since the trim is substantially constant, a variation in the lift applied at the center of lift-center of gravity as the wings are moved to vary their angle of incidence does not tend to change the trim or level relationship of the fuselage to the ground. This, of course, is an important advantage not only for the comfort of passengers but, even more important, for reasons of safety. Conventional aircraft have crashed on attempted landings because, after getting almost down, the pilot has suddenly attempted to climb back up and the drastic rotation of the aircraft into a nose up attitude has caused the tail section to crash into the ground. With the wing construction on the invention such an occurrence can be avoided because movement of the wings into the high lift position plus a surge of power will cause the aircraft to climb rapidly without any substantial change in the level position of the fuselage.

In the foregoing description of the wing operation during ascent and descent, it should be noted that the wing is lowered into a lifting position in both cases. What the aircraft does under this wing condition depends upon the power applied and this is in accord with a basic law of flight which is that *Performance of Aircraft=Attitude+Power*. Assuming, then, that the wings have been lowered into a position in which they have a positive angle of attack and the resultant amount of drag, if little or no power is applied the aircraft will descend quite rapidly. The addition of power will slow the rate of descent, and further power will result in a condition in which level slow flight occurs. Beyond this point, if still further power is applied the aircraft will start to climb, and with still more power the rate of climb will be accelerated.

Turning while in flight is effected by lowering the wing on the side towards which the turn is to be made. Thus, to turn to the right, the right wing is lowered to increase the angle of attack of its main lift portion. This, of course, produces drag which slows the movement of the wing through the air and results in the turning action. This is an instance where the wings operate independently, there being no corresponding movement of the left wing which, therefore, will continue to move through the air at the same speed. This is similar to the turning action of a tracked vehicle where the turn is effected by slowing track movement on one side and speeding it on the other. In the aircraft of the invention, the turning radius will be governed by the amount the inside wing is lowered and the speed of the aircraft.

The turning action explained above assumes level flight and an initial high wing or high speed position. If the aircraft is climbing so that the wings are in a lowered, high lift position, turning is accomplished by raising the wing on the side away from the turn. Obviously, the operation is exactly the same when the aircraft is descending. From this description, it will be apparent that a conventional rudder control is not needed for the construction disclosed herein. In fact, it is believed that a modern high rudder structure would be undesirable because of its tendency to produce excessive yawing and "Dutch roll," particularly with severely swept back wings. As pointed out, the variable incidence wings 33, by independent action, can serve the same function as a conventional rudder, and in addition their forward location and manner of operation permits them to automatically compensate for the skid and slip tendency in turns that is caused by the wrong application of rudder.

A very important feature of the wing construction of the invention is the ability of the wing to make advantageous use of the "bow wave" effect. Just as a boat moving through the water creates a bow wave, an aircraft fuselage creates a similar wave of air. To utilize the bow wave thus created, however, the wings must be located adjacent the upper part of the fuselage and not below it as in most aircraft presently being built. When the wings are located near the top of the fuselage, they are properly located to utilize the added lift the bow wave provides.

Here again, a bird analogy is pertinent because in all birds the wings are connected to the upper part of the body to take advantage of the bow wave created by the bird's head and breast as it moves through the air. Also, like a bird in soaring flight, the wings 33 can be lowered to a high angle of attack position to make maximum use of the bow wave or can be raised substantially above it so that it has little effect on the wings. In this connection, it should be pointed out that bow wave has substantially no effect on the control portions of the wings, regardless of wing position, because of their outboard locations.

It has been stated that the fuselage normally maintains a level position and that no part of the wings ever exceeds a 22° positive angle of attack. However, if something is wrong with the trim of the aircraft and it is climbing at an angle approaching the stall point, the bow wave is an effective counteractant to stalling because it moves back towards the trailing edges of the wings thus moving the centers of lift or fulcrums rearwardly so that the weight forward thereof forces the nose down into a safe position. It is also possible, if the aircraft has sufficient speed, to have the force of the bow wave raise the wings which would also cause a quick resumption of level flight.

Mention has been made of yawing and stalling. The control portions of the wings, because they always have some negative angle of attack, are effective yaw dampers. Similarly, the control portions and the entire hinged wing construction tend to automatically compensate against rolling. The wings, aided to some degree by the tail structure, also tend to automatically compensate against pitching. An aircraft having wings 33 is not likely to become an uncontrollable screw thread simply because the wings are not rigidly fixed to the fuselage. In a conventional aircraft, movement of one wing, no matter how slight, is accentuated by the other—if one wing goes up, the other must go down. With wings 33, if the aircraft is inclined downwardly and tending to roll dangerously into a spin, the wing on the side of the roll will be forced upwardly and automatically combat the spin tendency.

Figures 16, 17:
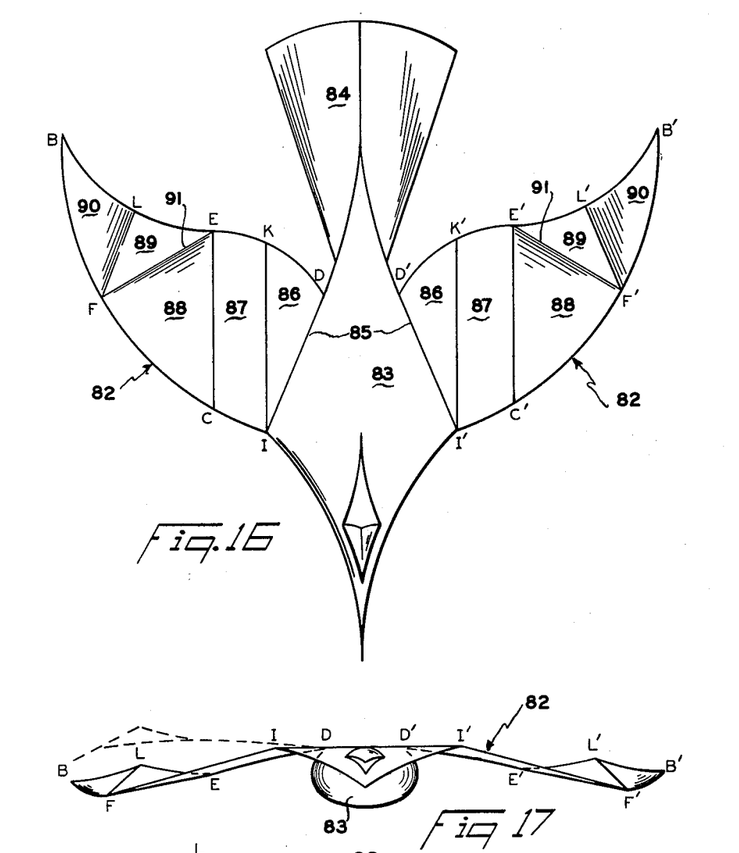
FIGURE 16 is a schematic top plan view of an aircraft having wings constructed according to the modification of FIGURE 15.
FIGURES 17 and 18 are front and side elevations, respectively, of the aircraft of FIGURE 16.
Figure 20:
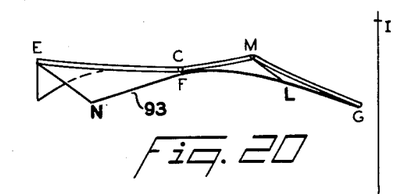
FIGURE 20 is a rear elevation of the wing of FIGURE 19 showing the wing flap in lowered position.

The wings disclosed herein are highly stable, and this is at least partially due to the arch of the wing as best shown in FIGS. 17 and 20 to be described. Referring back to FIGS. 1-3 and the derivation of FIG. 4, it should be pointed out that each of the wing panels can be a spheric section as in a bird wing rather than a planar section as in a bat or pterodactyl wing, and as shown in the drawings for ease of illustration. Various combinations of the panels, such as panels 38 and 39, and 40 and 41, can be formed as a single spheric section or portion of a spherical triangle. Essentially, in the wings of the invention the undersurfaces are the most important for operation in the described manner, with the exception of the control portions. Other than as to the control portions, the configuration of the upper surfaces of the wings is not critical except in regard to weight and streamlining.

Figure 7:
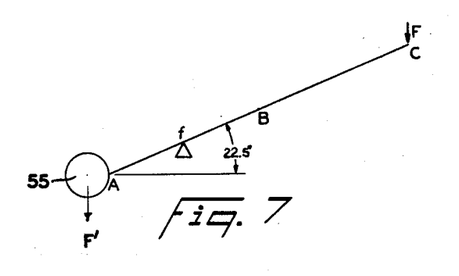
FIGURES 7–10 are diagrammatic views showing the lever principle as applied to the wings of the invention and others.
Figure 8:
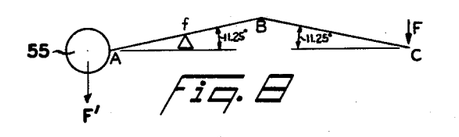

FIGS. 7-10 diagrammatically illustrate how the lever-fulcrum principle affects the stability of various wing arrangements. Each figure represents a front elevation of a fuselage 55 and left wing (on the right in the drawings). In each wing ABC, the point B represents the mid-point in the wing length, the small triangle $f$ represents the fulcrum and force F is a downward force acting on the outboard end C of the wing which is treated as a lever. Force F represents the weight of the wing, the weight of the fuselage also being represented by the force F'. Fulcrum $f$ represents the center of lift and is arbitrarily located approximately halfway between points A and B in FIGS. 7, 9 and 10. In FIG. 8, which represents the wing of the invention, the center of lift is actually located at this approximate point and points A and B on this wing correspond to points K and B on the FIG. 4 derivation.

Figure 9:
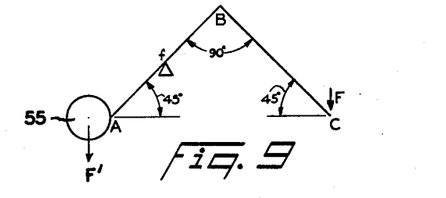
Figures 10, 11, 12:
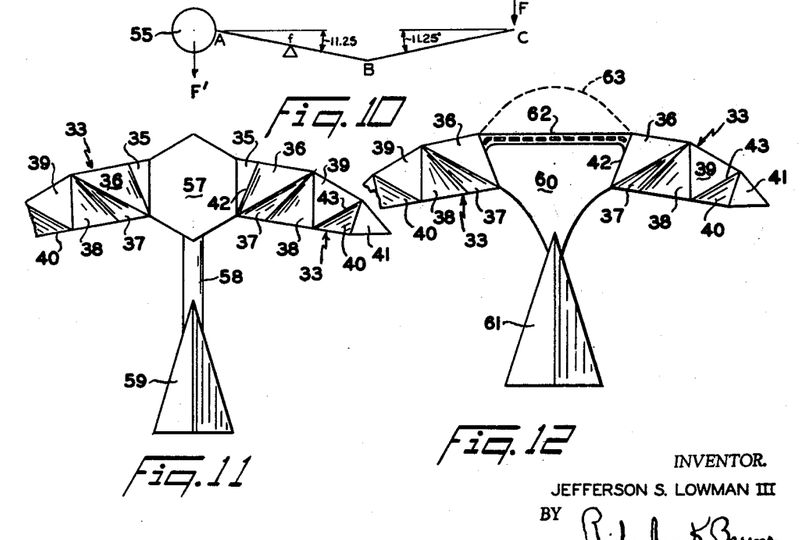
FIGURES 11 and 12 are schematic top plan views of the wing of FIGURE 1 as applied to modified fuselage and tail structures.

FIG. 7 represents a conventional wing wherein the lever ABC is straight, the angle of inclination being somewhat exaggerated. In the wing of the invention, FIG. 8, the lever is bent since the wing is arched. This arrangement has more stability than the FIG. 7 arrangement yet there is little loss of mechanical advantage in force F acting at C, force F in this figure being the hold-down force exerted by the control portion of the wing. FIG. 9 is hypothetical but illustrates in an exaggerated manner that if the wing arch is too great, the moment arm for the force F at point C becomes too short which reduces stability. In FIG. 10 the wing is arched in the reverse direction from FIG. 8, and some aircraft are presently built with such a construction. However, this is an unnatural and unstable construction since with the forces acting as shown, the lever ABC tends to turn completely over on the fulcrum $f$ so that it is in the position shown in FIG. 8. Thus it may be seen that the arch of the several wings herein described must never become greater than that shown in FIG. 8 for most efficient operation, and the angle of arch at Point B must not be less than 157°.

FIGS. 11 and 12 are schematic plan views showing other types of fuselages with which the wing 33 can be used. Because the wings can operate independently and are capable of providing a large amount of lift, the wings can be separated a substantial distance as indicated in these views, it having been determined that a separation equal to at least half the wing span is possible. In FIG. 11, the longitudinal dimension of the fuselage 57 is compressed so that most of its mass is concentrated between the wings. The slender portion 58 in this construction does little more than connect the tail structure 59 to the main part of the fuselage 57. In the FIG. 12 construction, the fuselage 60 is also compressed longitudinally but merges in a more streamlined manner into the tail structure 61. A fuselage of this design can be provided with a forward facing observation deck 62, and may also be provided with a forwardly extending nose portion indicated by the dash line 63. One difference in these two fuselages that should be noted is that in FIG. 11 the fixed connecting portion 35 is still a part of the wing whereas in FIG. 12 it has been merged with and made a part of the fuselage. The primary hinge joint 42 is still offset approximately 22° in both, however, as is indicated on the drawings.

Referring again to the operation of the wing as described above in connection with ascent, descent and turning, and as a roll, pitch and yaw control, it will be apparent that all primary flight controls are located in the wing tips which not only results in safer flight but greatly simplifies the work of the flight crew. Moreover, with this construction, the need for currently popular but complicated devices such as slots, slats, spoilers and the like is substantially eliminated.

SECOND MODIFICATION

Figures 5, 6:
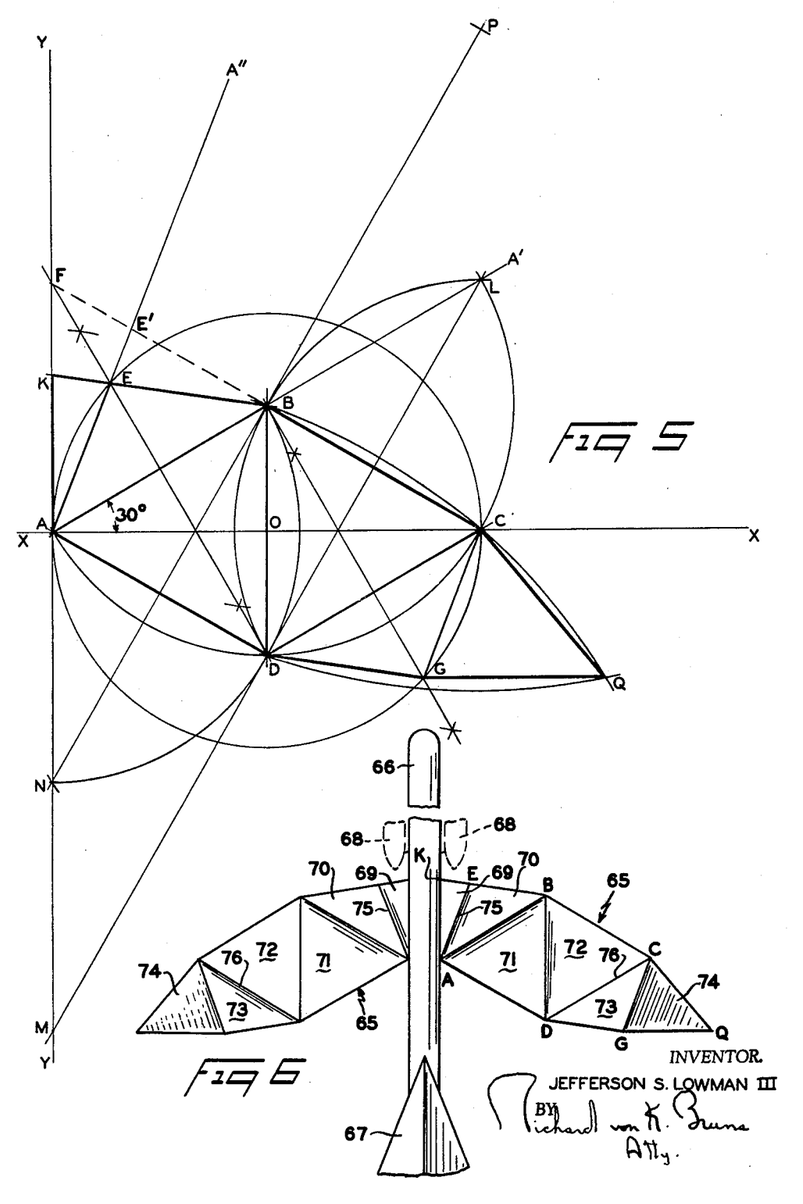
FIGURE 5 is a diagrammatic illustration of a mathematical derivation of a modified form of the wing of the invention.
FIGURE 6 is a schematic top plan view of an aircraft having wings constructed according to the modification of FIGURE 5.

FIGS. 5 and 6 illustrate a modified form of the wing of the invention. This wing is designated generally by reference number 65 in FIG. 6 and forms a part of an aircraft having a suitable fuselage 66 and tail structure 67. The engines can be mounted beneath the tail structure as shown in FIGS. 1-3, or at the forward part of the fuselage as indicated by the fragmentary engine pods 68 shown in dash lines. Each wing 65 includes a fixed connecting portion or panel 69, and panels 70-74 proceeding outboard from panel 69. The primary hinge joint 75 is at the junction of panels 69 and 70, and the secondary hinge joint 76 is at the junction of panels 72 and 73. Panels 70, 71 and 72 comprise the main lift portion of the wing and are rigidly connected to one another at their respective junctions, and panels 73 and 74 comprise the control portion and are likewise rigidly connected together.

The modification of FIG. 6 has one less panel in the main lift portion of the wing than wing 33 of FIGS. 1–3 but otherwise is constructed in substantially the same manner and operates in exactly the same manner. The elimination of the one panel or spheric section results in a wing having a slightly lower aspect ratio but the wing is otherwise as versatile and stable as the previously described modification.

The configuration and proportions of the wing shown in FIG. 6 have been derived by mathematical means and one such derivation is disclosed in FIG. 5, other derivations being possible. The derivation of FIG. 5 is as follows:

(1) Construct horizontal and vertical axes X—X and Y—Y intersecting at point A.

(2) Draw line AA' at a 30° angle to the X—X axis.

(3) Lay off AB 2½" long. (The length AB is, of course, scaled down in the drawing. In practice it will be measured in feet and its length will be determined by the wing span or wing area desired.)

(4) Drop a perpendicular from B to the X—X axis and extend down. The intersection point is O.

(5) Draw a circle with O as the center and OA as the radius. This circle intersects the X—X axis at A and C.

(6) Construct diamond ABCD (comprising four equal 30°–60°–90° triangles).

(7) Bisect line AB and erect a perpendicular. This line intersects the circle at E and the Y—Y axis at F. Extend the line downwardly to point D.

(8) Bisect line DC and erect a perpendicular. This line intersects the circle at G. Extend the line upwardly to point B.

(9) Draw a line AA" through point E. (The line AE establishes the primary hinge angle.)

(10) Draw lines EB, DG and GC. (It will be seen that two equal kite shaped figures AEBD and CGDB have now been constructed.)

(11) Extend line BE to the Y—Y axis. The intersection point is K.

(12) Using B as the center and BD as the radius, draw an arc through points D and C and extend upwardly.

(13) Using C as the center and CD as the radius, draw an arc through points D and B and extend upwardly to intersect the arc drawn in step 12.

(14) The intersection of these arcs is point L. Point L should lie on the line AA'.

(15) Draw line LD and extend downwardly to cross the Y—Y axis.

(16) On this line lay off DM equal to DL. Point M should fall on the Y—Y axis.

(17) Using M as the center and MB as the radius, swing an arc to the right. This arc passes through points B and C and can be the leading edge of the wing.

(18) Using A as the center and AB as the radius, swing an arc to the right and across the Y—Y axis.

(19) Using D as the center and DB as the radius, swing an arc down to the left and across the Y—Y axis.

(20) Label the intersection point of these two arcs N. Point N should fall on the Y—Y axis.

(21) Draw a line NB and extend upwardly.

(22) On this line lay off BP equal to BN.

(23) Using P as the center and PD as the radius, swing an arc to the right to intersect the arc constructed in step 17. This arc can be the trailing edge of the wing.

(24) Label the intersection of these arcs point Q. This point determines the limit of the wing span.

(25) Draw lines CQ and GQ.

In the FIG. 5 derivation, the Y—Y axis represents the line of the fuselage, and the wing outline (in a clockwise direction) is K–E–B–C–Q–G–D–A, as is also shown in FIG. 6. Line AE represents the primary hinge joint 75, and the above described derivation results in this line being offset approximately 22° from the Y—Y axis. In other words, the angle KAE is approximately 22° as has been stated before. The secondary hinge joint 76 is along line DC. For certain applications, the wing could also include the area bordered by line KF and dash line FB (line BC extended to the left) in which case the primary hinge joint would extend to the point E'. In the modification of FIGS. 5 and 6, unlike the modification of FIGS. 1–3, it will be seen that the original diamond ABCD is completely contained in the two outer panels 71, 72 of the main lift portion of the wing. This enables this entire portion of the wing 65 to be formed as a single, perfect spheric section in the manner described hereinabove.

THIRD MODIFICATION

Figures 13, 14:
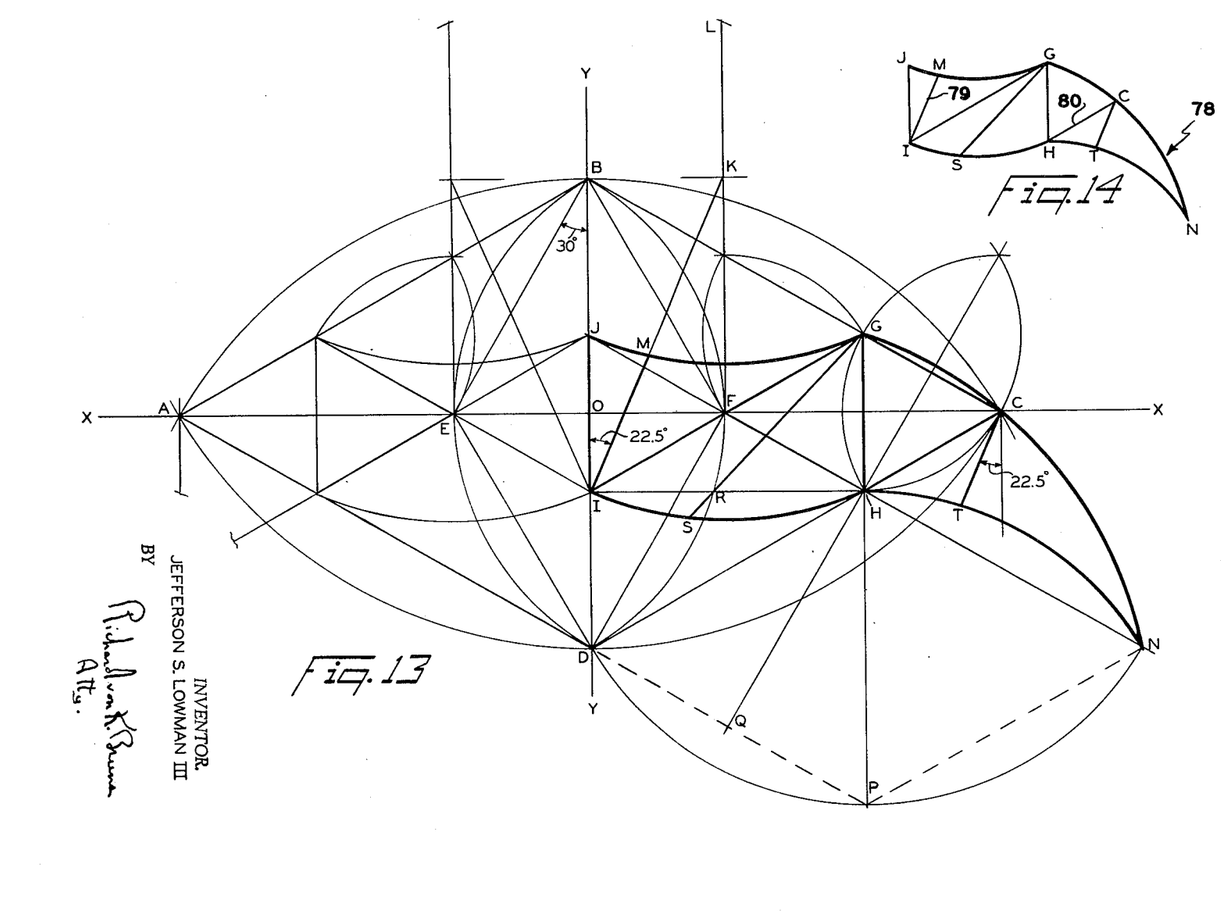
FIGURE 13 is a diagrammatic illustration of a mathematical derivation of another modified form of the wing of the invention.
FIGURE 14 is a schematic top plan view, on a reduced scale of the right wing of FIGURE 13.

FIGS. 13 and 14 illustrate another modified form of the invention. This wing is generally designated by reference number 78 in FIG. 14, and has its primary hinge joint 79 along line IM and its secondary hinge joint 80 along line HC. As before, the portion of the wing between the hinge joints is the main lift portion while the control portion is outboard of the secondary hinge joint 80. The wing of this modification has the same number of basic panels as the wing of FIGS. 1–3 but has a relatively high aspect ratio for applications where this may be desirable. In bird analogy, the wing of FIGS. 13 and 14 corresponds generally to the wing of a seagull.

As in other modifications, the configuration and proportions of the wing shown in FIGS. 13 and 14 have been derived by mathematical means, one such derivation being disclosed in FIG. 13. The FIG. 13 derivation is as follows:

(1) Construct horizontal and vertical axes X—X and Y—Y intersecting at point O.

(2) Using an arbitrary point D on the lower Y—Y axis as the center, swing an arc AC intersecting the upper Y—Y axis at B. (In actual practice, the radius of this arc can be calculated after the wing span has been determined.)

(3) Using B as the center and BD as the radius, swing arc ADC. This forms a 60°–120° elipse ABCD. Draw lines AB, BC, CD and DA.

(4) From point B draw line BE at a 30° angle from line BD.

(5) Using E as the center and EB as the radius swing an arc BD intersecting the X—X axis at point F.

(6) Using F as the center and FB as the radius, swing an arc BED. Draw lines BF, FD, DE and EB.

All steps hereinafter are with reference to the right wing only, the left wing being the same.

(7) Bisect line FC and erect a perpendicular. This line intersects BC at G and CD at H.

(8) Draw line GF and extend to intersect the Y—Y axis at I.

(9) Draw line HF and extend to intersect the Y—Y axis at J. (The X—X and Y—Y axes are now divided into three equal parts within the elipse ABCD.)

(10) At point C construct a perpendicular to the X—X axis extending downwardly.

(11) Extend line FH down and to the right.

(12) At point F draw a vertical line parallel to the Y—Y axis.

(13) Draw a horizontal line through point B parallel the the X—X axis. This line intersects the line drawn in the step 12 at point K.

(14) Draw line I–K. This line is angularly offset from the Y—Y axis approximately 22.5° and establishes the primary hinge joint.

(15) Using K as the center and KI as the radius, swing trailing edge arc IH.

(16) On line FK extended upwardly locate point L a distance above K equal to line IJ.

(17) Using L as the center and LJ as the radius, swing leading edge arc JG. This crosses hinge line IK at point M.

(18) Using H as the center and HD as the radius, swing an arc to the right intersecting the extension of line FH at point N. This point determines the limit of the wing span.

(19) Extend line GH downwardly to intersect arc DN at point P.

(20) Using P as the center and PN as the radius, swing trailing edge arc NH.

(21) Draw a dash line connecting points D and P.

(22) Erect a perpendicular bisector to line GC and extend downwardly to intersect dash line DP at point Q.

(23) Using point Q as the center and QN as the radius, swing leading edge arc NCG.

(24) Connect points I and H. This line intersects the inner ellipse BFDE at point R.

(25) Draw line GR and extend to intersect the trailing edge at point S.

(26) Draw line CT at a 22.5° angle to the perpendicular line extending down from point C.

In the FIG. 13 derivation, the Y—Y axis represents the line of the fuselage, it being understood that the two wings that have been simultaneously derived will be separated by the width of the fuselage. Line MI represents the primary hinge joint 79, and the above described derivation results in this line being offset approximately 22.5° from the Y—Y axis. In other words, the angle JIM is approximately 22.5°. The secondary hinge joint 80 is along the line HC.

FOURTH MODIFICATION

Figure 18:
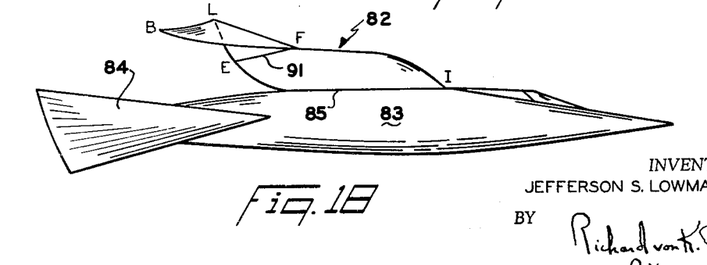

Another modified form of the wing of the invention is shown in FIGS. 16–18. This wing is generally designated by the reference number 82 and forms a part of an aircraft having a fuselage 83 and a merging tail structure 84. While no engines are shown in these views, they can be mounted beneath the tail structure as shown in FIGS. 1–3 or at some point on the fuselage where they will not interfere with wing movement. The primary hinge joints 85 for the wings 82 are along the lines ID and I'D' where the wings join the fuselage. In other words, these wings have no fixed panels corresponding to the panel 35 shown in FIGS. 1–3, that part of the wing having been made a part of the fuselage in this modification. Proceeding outboard from hinge joints 85, each wing 82 comprises panels 86–90. The secondary hinge joints 91 are along the lines FE and F'E'. Panels 86, 87 and 88 comprise the main lift portion of each wing and are rigidly connected to one another at their respective junctions as in other modifications. Panels 89 and 90 form the control portion of each wing and are likewise rigidly connected together.

Figure 15:
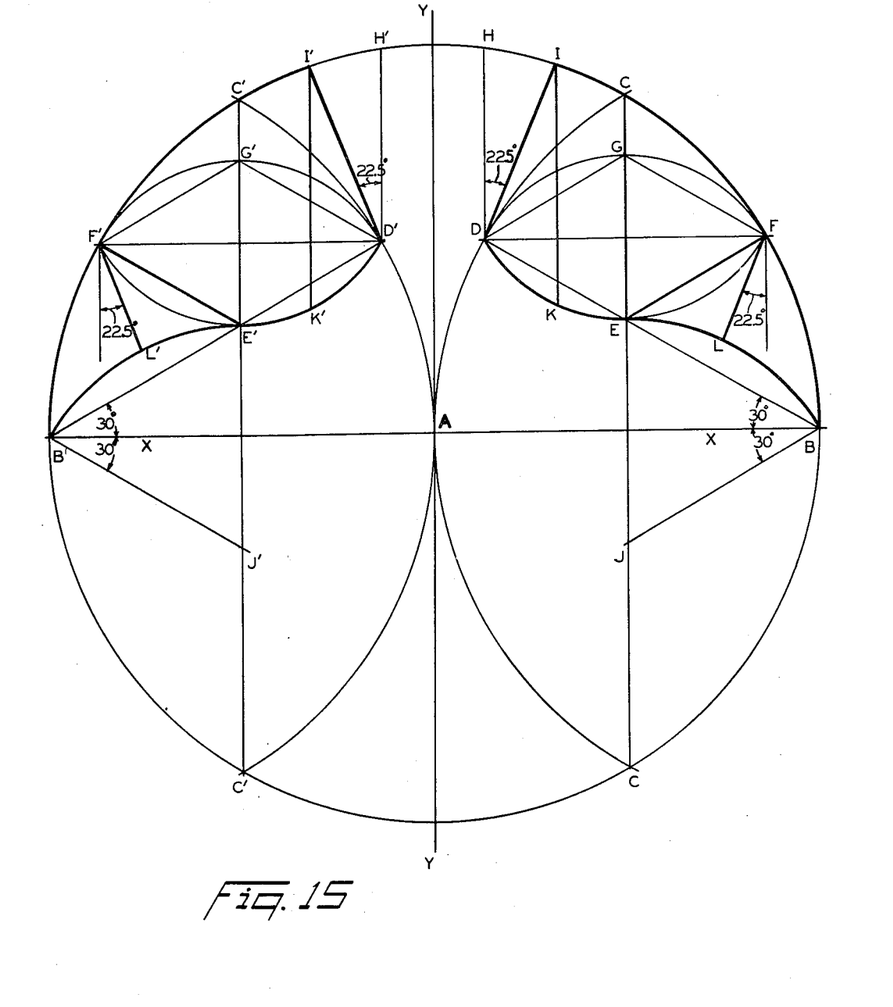
FIGURE 15 is a diagrammatic illustration of a mathematical derivation of another modified form of the wing of the invention.

The wings 82 have also been derived by mathematical means, and the derivation is disclosed in FIG. 15. The derivation of FIG. 15 is as follows:

(1) Construct horizontal and vertical axes X—X and Y—Y intersecting at A.

(2) Using A as the center and AB as the radius construct a circle. (In practice, the radius AB is determined from the wing span that is desired.) The left side of the circle crosses the X—X axis at B'.

(3) Using B as the center and BA as the radius, swing an arc intersecting the circle at points CC. Repeat this step using B' as the center. This results in two 60°–120° ellipses CACB and C'AC'B'.

(4) Draw vertical lines connecting CC and C'C'.

All steps hereinafter are with reference to the right wing only, the left wing being the same.

(5) From point B draw a line upwardly at a 30° angle to the X—X axis. This line intersects the ellipse at point D and intersects line CC at point E.

(6) Draw a line through D parallel to the X—X axis. This line intersects the circle at point F.

(7) Draw line EF and using E as the center and EF as the radius, swing arc FD which intersects line CC at point G.

(8) Using G as the center and GF as the radius, swing arc FED. This results in an additional 60°–120° ellipse.

(9) Draw lines FG and GD forming four equal 30°–60°–90° triangles in ellipse FGDE.

(10) Draw a vertical line upwardly from point D parallel to the Y—Y axis. This line intersects the circle at point H.

(11) Draw line DI at a 22.5° angle to vertical line DH.

(12) From point B draw a line downwardly at a 30° angle to the X—X axis. This line intersects line CC at point J.

(13) Using J as the center and JB as the radius, swing arc BE which forms a portion of the trailing edge of the wing. The remainder of the trailing edge is formed by ellipse arc ED.

(14) Draw a vertical line downwardly from the point I parallel to the Y—Y axis. This line intersects the trailing edge at point K.

(15) Draw a vertical line downwardly from point F.

(16) Draw a line through point F at a 22.5° angle from the vertical line constructed in step 15. This line intersects the trailing edge at point L.

In the FIG. 15 derivation, the wings are connected to the fuselage along the lines ID and I'D', which form the primary hinge joints 85. If these wings were to be used with a straight sided fuselage as shown in FIGS. 1–3, the wings would be connected to the fuselage along the lines HD and H'D', and the triangles HDI and H'D'I' would correspond to the fixed wing panels 35. In either case, the angular offset of the hinge joints remains the same. In this modification the secondary hinge joints 91 are along the lines EF and E'F' as previously stated. It should be noted that the modification of FIGS. 15–18 differs from previous modifications in that the junctions between the main lift panels 86 and 87, and 87 and 88 are along lines that are parallel to the longitudinal axis of the fuselage. This in no way alters the operation of the wing as above described but does simplify construction of an arched wing having great stability. It should also be noted that the derivation of FIG. 15 results in a a wing having greater sweep-back than those that have been previously described.

FIFTH MODIFICATION

Figure 19:
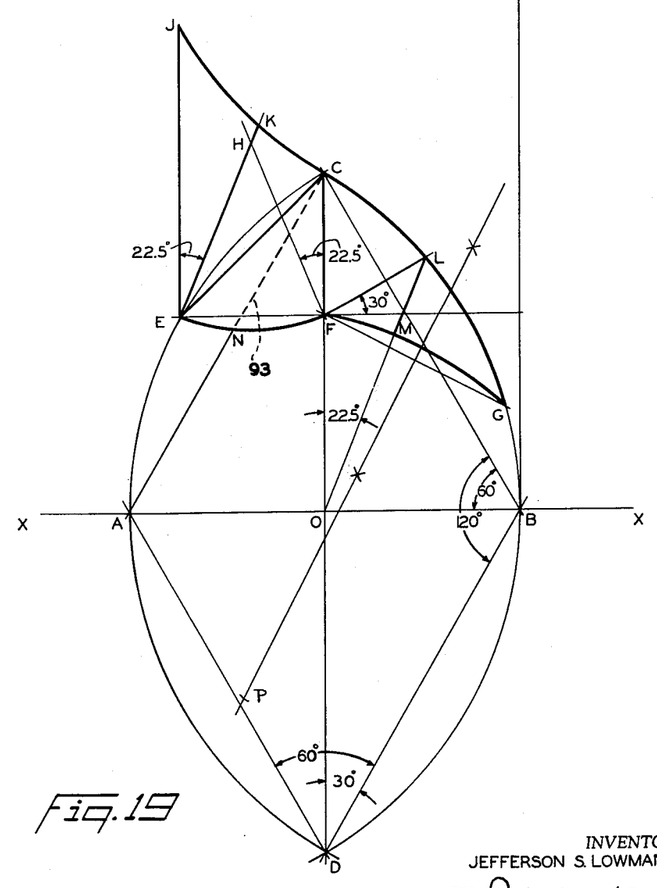
FIGURE 19 is a diagrammatic illustration of a mathematical derivation of still another modified form of the wing of the invention.
Figure 21:
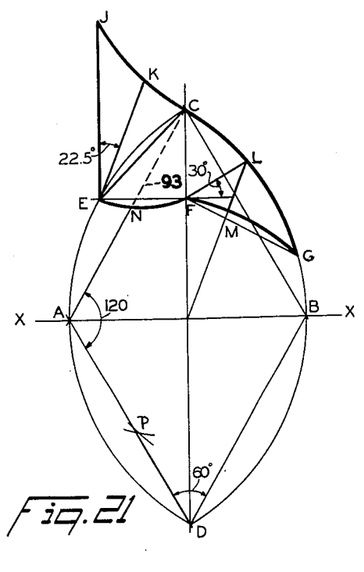
FIGURE 21 is a schematic top plan view, on a reduced scale, of the modification of FIGURE 19.

FIGS. 19–21 show a further modified form of the invention, the views except for FIG. 20 simply illustrating how this particular wing is derived. The wing itself is quite similar to the wing disclosed in FIGS. 15–18 although the derivation is different. Even as to the derivation, however, both have as a starting point a 60°–120° ellipse, the ellipses CBCA and CBDA of FIGS. 15 and 19, respectively, being similar. The derivation of FIG. 19 is as follows:

(1) Draw horizontal axis X—X and arbitrarily place point A thereon.

(2) With point A as the center, swing an arc intersecting the X—X axis at point B. (In practice, radius AB will be determined from the wing span desired.)

(3) Using B as the center and AB as the radius, swing a second arc intersecting the first arc at upper point C and lower point D. Draw line CD intersecting the X—X axis at point O.

(4) Bisect arc AC. The midpoint is E.

(5) Draw a line through point E parallel to the X—X axis. This line intersects vertical line CD at F.

(6) Draw a vertical line upwardly from point E.

(7) Locate point G on arc CB so that the point is at a distance of 1½ times the arc EC measured from point C.

(8) Draw a line from G to F.

(9) Erect a perpendicular bisector to line GF.

(10) Using a point P on the perpendicular bisector as the center and a radius equal to AB, swing an arc through points G and F.

(11) From point E draw a line at a 22.5° angle to the vertical line through E. Do the same from point F. These lines intersect at point H.

(12) Using H as the center and HE as the radius swing arc EF.

(13) Through point B draw a line perpendicular to the X—X axis. On this line lay off BI equal to line CD.

(14) Using I as the center and a radius equal to AB, swing an arc from point C to the vertical line through E. The intersection is point J. This arc also intersects the 22.5° line EH at point K.

(15) From point F draw a line at a 30° angle to line EF. This line intersects arc CG at point L.

(16) Draw a line OL. Line OL is offset approximately 22.5° from the vertical line CO. This line intersects arc FG at M.

(17) Draw line EC.

(18) Draw line AC. This line intersects arc EF at point N.

In the FIG. 19 derivation, the wing can be connected to the fuselage along line JE, or along line KE if triangle JKE is made a part of the fuselage as in FIGS. 16–19. The wing outline (in a clockwise direction) is J–K–C–L–G–F–E, and the primary hinge joint is along the line KE while the secondary hinge joint is along the line FL. As in all the other modifications, the primary hinge joint is offset 22° or 22.5° from the longitudinal axis of the aircraft fuselage. The wing shown in FIGS. 19–21 is also provided on its under surface with an offset flap 93 which is represented by the triangle ECN. This flap is hinged along the panel junction EC and is arranged with its apex C at the leading edge of the wing and its base EN at the trailing edge. FIG. 20, which shows a schematic rear elevation of the wing of FIG. 19 shows the flap 93 in a lowered position. In its upper position the flap 93 blends with the undersurface of the wing in the same manner as flaps, slats, and the like on conventional aircraft. The operation of this flap will be explained in more detail hereinafter.

Figure 22:
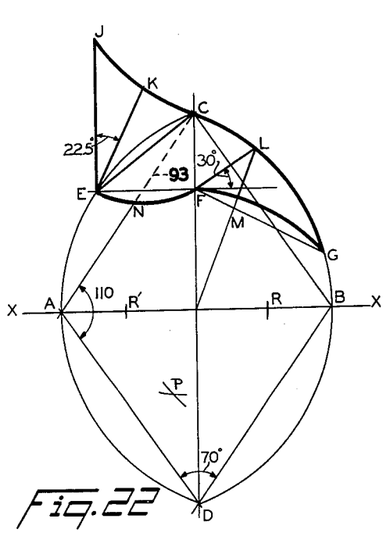
FIGURES 22–24 are other forms of the wing derived in the manner of FIGURES 19 and 21, and illustrating possible variations in sweep back and aspect ratio.
Figure 23:
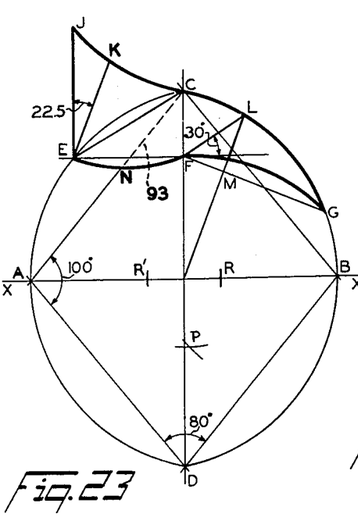
Figure 24:
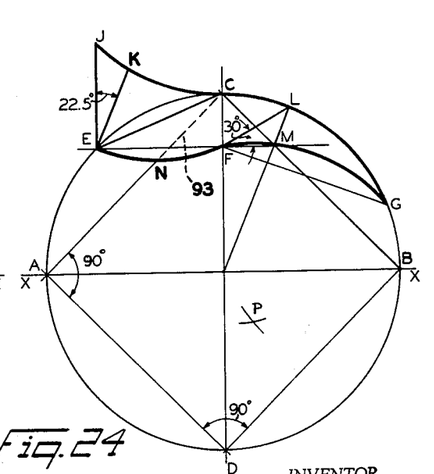

Each of the wings shown in FIGS. 22–24 is derived in substantially the same way as the wing of FIGS. 19–21, and has a primary hinge joint KE and secondary hinge joint FL with the same angular offsets. In addition, each wing comprises the same number of panels in the same relationship and each is provided with a flap 93 represented by triangle ECN. The purpose of FIGS. 22–24 is to illustrate how the aspect ratio can be varied in wings having substantially the same derivation. Thus, it will be noted that the aspect ratio gradually progresses from low to high in the wings shown in FIGS. 21–24.

The increase in aspect ratio is accomplished by varying the starting elipse from that shown in FIG. 21 to the full circle shown in FIG. 24, all other steps of the derivation being the same. With reference to FIG. 21, which is simply FIG. 19 on a reduced scale for comparison purposes, a 60°–120° elipse was used and the diamond ACBD was laid out inside it. In FIG. 22, the diamond ACBD was constructed first, the diamond having included angles of 110° and 70°. Similarly, in FIG. 23 the diamond was constructed first, the diamond in this instance having included angles of 100° and 80°. The surrounding elipse in each of these figures was constructed by erecting a perpendicular bisector to the sides AC and CB of the diamond. The bisectors cross the X—X axis at points R and R′ respectively, and RA and R′B then become the radii for the sides of the elipses. In FIG. 21 the centers A and B for the elipse arcs are located on the opposite arcs, but it will be seen that the arc centers move towards the longitudinal axes of the elipses in the succeeding figures until the axis is reached in FIG. 24 and the elipse becomes a circle. At the same time, the wing gradually becomes longer and narrower as is clearly shown.

Referring again to the flaps 93 shown in the wings of FIGS. 19–24, the specific location of these flaps is important since they, in effect, serve as a positive fulcrum against which the lever shown in FIG. 8 can work. Obviously, these flaps when lowered operate to increase the lift of the wing, and when used independently they also are a material aid in the turning function. The flaps 93 can also serve as a fulcrum in another sense, i.e., to combat any tendency to yaw. An added important advantage of flaps in this particular location is that they can cooperate with the control portions of the wings to substantially change lift and drag without changing the center of lift and center of gravity. Moreover, this can be done without having any portion of the wing exceed a 22° angle of attack. Thus, if the flap 93 is lowered 22° and the control portion is raised 22°, their angular displacement relative to each other is 44° but with reference to the relative air their individual angles of attack are still 22°. This achieves the same braking effect as a single flap being lowered 44° in a conventional wing but without the turbulent buffeting that a 44° flap frequently causes.

From the foregoing, it will be apparent that the invention disclosed herein provides a novel yet aerodynamically practical wing construction which permits safer and more efficient flight in modern aircraft. Thus, the construction of the invention permits the high speeds that are presently in demand without endangering those aboard the aircraft or the aircraft itself. This is accomplished, moreover, by simpler rather than more complicated controls and by a construction that is far less complex than most that are currently being developed.

As will be understood by those familiar with this art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. In an aircraft having a fuselage and tail structure: wings operatively connected to the fuselage, each of said wings including a main lift portion independently movable relative to the fuselage for varying the angle of incidence of the lift portion during operation of the aircraft; and means to move the main lift portion of each wing into the angular position desired comprising a control portion forming a part of the wing and movably connected to the outboard end of the lift portion, and means operable from within the fuselage to positively control the position of said control portion.

2. In an aircraft including a fuselage and tail structure: variable incidence, swept wings for the aircraft each having a main lift portion operatively connected to the fuselage for independent movement relative thereto during flight, a smaller control portion for each lift portion movably connected to the outboard end thereof, and means for independently regulating the positions of said control portions during flight, each main lift portion assuming an angle of incidence determined by the position into which its control portion is moved.

3. An aircraft including a fuselage and wings movable relative to the fuselage during operation of the aircraft to vary the angle of incidence of the wings, each of said wings comprising: an inboard portion secured to the fuselage, a main lift portion connected to said inboard portion for movement relative thereto, a control portion connected to the outboard end of said main lift portion for movement relative thereto, the area of said control portion being smaller than that of said main lift portion, and means operable from within the fuselage to control the position of said control portion, the position of said control portion determining the angle of incidence assumed by said main lift portion in each wing.

4. A swept, variable incidence wing for use with a vehicle, said wing having primary and secondary transverse hinge joints to permit it to be raised and lowered relative to the vehicle, said wing including a main lift portion and a control portion, said main lift portion being operatively connected at its inboard end to the vehicle by said primary hinge joint, said primary hinge joint being offset from the fore and aft axis of the vehicle by an angle in the range of 7–27° measured from the front of the vehicle rearwardly, said control portion being connected at its inboard end to the outboard end of said main lift portion by said secondary hinge joint, the area of said control portion being smaller than that of said main lift portion.

5. In an aircraft including the fuselage: variable incidence wings each of which comprises a main lift portion operatively connected to the fuselage by a hinge joint for movement relative to the fuselage during operation of the aircraft, said hinge joint being offset from the longitudinal axis of the fuselage by an angle in the range of 18–26° measured from the nose of the fuselage rearwardly, a control portion for said main lift portion movably connected to the outboard end thereof by a second hinge joint, and means operable from within the fuselage to control the position of said control portion, said control portion having a substantially smaller area than said main lift portion.

6. In an aircraft including a fuselage: variable incidence, swept wings connected to the fuselage adjacent the top thereof, each of said wings including a main lift portion operatively connected to the fuselage by a hinge joint for movement relative to the fuselage during operation of the aircraft, said hinge joint extending substantially transversely of the wing and being offset from the longitudinal axis of the fuselage by an angle of approximately 22° measured from the nose of the fuselage rearwardly, a control portion forming a part of the wing and movably connected to the outboard end of said main lift portion by a second hinge joint, said control portion having a smaller area than that of said main lift portion, and means operable from within the fuselage to control the position of said control portion.

7. In an aircraft having a fuselage and tail structure: a pair of variable incidence, swept wings each having primary and secondary hinge joints to permit the wing to be raised and lowered relative to the fuselage; means cooperating with said hinge joints to limit the range of up and down movement permitted; each of said wings including a main lift portion operatively connected at its inboard end to the fuselage by said primary hinge joint, said primary hinge joint being offset from the longitudinal axis of the fuselage by an angle in the range of 7–27° measured from the nose of the fuselage rearwardly; means to move the main lift portion of each wing comprising a control portion forming a part of the wing, said control portion being connected at its inboard end to the outboard end of said main lift portion by said secondary hinge joint, said control portion having a smaller area than that of said main lift portion; and means operable from within the fuselage to positively control the position of each wing control portion.

8. An aircraft including a fuselage and wings movable relative to the fuselage during operation of the aircraft to vary the angle of attack of the wings, each of said wings including a main lift portion and a control portion, said main lift portion comprising the major part of the wing and being located adjacent the fuselage, said control portion comprising substantially the remainder of the wing and being located outboard of said main lift portion, each of said wings also including a primary and a secondary hinge joint which joints extend substantially transversely of the wing, said main lift portions being operatively connected to the fuselage by said primary hinge joints, said control portion being connected to said main lift portions by said secondary hinge joints, and means for moving each wing control portion relative to its main lift portion during operation of the aircraft, the position of each main lift portion being controlled solely by the adjusted position of its control portion whereby the latter determines the angle of attack of the former.

9. Structure as defined in claim 8 wherein said wing control portions always have a negative angle of attack.

10. Structure as defined in claim 8 wherein the maximum positive angle of attack into which said wing main lift portions can be moved is approximately 22°.

11. A swept back, variable incidence, arched wing construction for an aircraft having a fuselage, said wing including a main lift portion movable relative to the fuselage for varying the angle of attack of the main lift portion during opeartion of the aircraft, said main lift portion being operatively connected to the fuselage by a substantially transverse hinge joint offset from the longitudinal axis of the fuselage by an angle in the range of 7–27° measured from the nose of the fuselage rearwardly, means cooperating with said hinge joint to confine the movement of said main lift portion within a predetermined range, said main lift portion being substantially freely movable within said range, means to force said main lift portion into the angular position desired comprising a control portion which also forms a part of the wing, said control portion being connected to the outboard end of said main lift portion by a second hinge joint for movement relative thereto, means cooperating with said second hinge joint to confine the movement of said control portion within a predetermined range, and means operable from within the fuselage to positively control the position of said control portion, the adjusted position of said control portion determining the angle of attack assumed by said main lift portion.

12. A wing construction as defined in claim 11 wherein the area of said control portion is substantially less than that of said main lift portion.

13. A wing construction as defined in claim 11 wherein said wing includes a relatively small inboard portion secured in fixed relation to the fuselage, said main lift portion being movably connected to said inboard portion by said first-named hinge joint.

14. A wing construction as defined in claim 11 wherein said main lift portion is movably connected to the fuselage by said first-named hinge joint.

15. A wing construction as defined in claim 11 wherein said main lift portion is confined to a range of movement of approximately 22°.

16. A wing construction as defined in claim 11 wherein said control portion is confined to a range of movement of approximately 22°.

17. In an aircraft including a fuselage: a pair of sweptback, variable incidence, arched wings connected to the fuselage adjacent the top thereof, each of said wings including a main lift portion independently movable relative to the fuselage for varying the angle of attack of the main lift portion during operation of the aircraft, said main lift portion being operatively connected to the fuselage by a substantially transversely extending hinge joint offset from the longitudinal axis of the fuselage by an angle of approximately 22° measured from the nose of the fuselage rearwardly, said hinge joint having means to confine the movement of said main lift portion within a predetermined range, said main lift portion being substantially freely movable within said range, said main lift portion being constructed so that a portion of the trailing edge thereof passes from below to above the leading edge thereof when the main lift portion is moved from its maximum to its minimum positive angle of attack position and vice versa, means to force the main lift portion of each wing into the angular position desired comprising a control portion which also forms a part of the wing, the area of said control portion being substantially less than that of said main lift portion, said control portion being connected to the outboard end of said main lift portion by a second hinge point for movement relative thereto, said second hinge joint having means to confine the movement of said control portion within a predetermined range, and means operable from within the fuselage to positively control the positions of said wing control portions, the position of the main lift portion of each wing being controlled solely by the adjusted position of its control portion whereby the latter determines the angle of attack that is assumed by the main lift portion, each of said wings also including on the underside of its main lift portion a movable flap, said flap being connected to the main lift portion by a hinge joint extending substantially transversely of the wing.

18. Structure as defined in claim 17 wherein said wing control portions have a negative angle of attack in every possible position within their range of movement.

19. Structure as defined in claim 17 wherein the maximum positive angle of attack into which said wing main lift portions can be moved is approximately 22°.

20. Structure as defined in claim 17 wherein said wing main lift and control portions are comprised of a plurality of panels in the form of spheric sections.

References Cited by the Examiner

UNITED STATES PATENTS

| | | | |
|---|---|---|---|
| 1,127,167 | 2/15 | Biais | 244—48 |
| 1,710,670 | 4/29 | Bonney | 244—48 X |
| 2,105,307 | 1/38 | Akerman | 244—46 |
| 2,684,214 | 7/54 | Perry | 244—48 |

FOREIGN PATENTS 501,879   3/39   Great Britain.

FERGUS S. MIDDLETON, *Primary Examiner.*